3,395,188
HYDROCHLORINATION OF OLEFINS

John J. Shook, Oakland, Calif., assignor to Chevron Research Company, San Francisco, Calif., a corporation of Delaware
No Drawing. Filed Jan. 26, 1966, Ser. No. 523,033
5 Claims. (Cl. 260—663)

This invention relates to ferric chloride catalyzed additions of hydrogen chloride to olefins. More particularly, it refers to the hydrochlorination of mono-olefinic hydrocarbons catalyzed by ferric chloride wherein concurrent isomerization of the olefin is substantially reduced or essentially eliminated.

The hydrochlorination of olefins is a useful reaction in organic chemical synthesis in which the olefinic function is replaced by the chloride group, thus introducing a different and desirable functionality into the molecule.

Uncatalyzed and catalyzed additions of hydrogen chloride to low molecular weight olefins have long been known and satisfactorily practiced. In the case of the higher molecular weight homologues, however, many problems are encountered including in particular extensive concurrent isomerization of the olefin feed thereby resulting in complex product mixtures, of rearranged alkyl chlorides, where unrearranged chloride is desired, and the like.

Frequently, it is desirable and even necessary in hydrochlorinations that there be little or no concurrent isomerization in order that the new functionality will be established at a known locus. For example, the production of a 2-chloroalkane by the hydrochlorination of a 1-alkene is not satisfactory when effected in the manner conventional to the art. Only a minor portion of the product is the desired 2-chloroalkane, the balance being internal chlorides.

It has now been found that ferric chloride catalyzed additions of hydrogen chloride to mono-olefinic aliphatic higher molecular weight hydrocarbons are improved to yield a chloride product of substantially increased purity and less rearranged chloride, provided that the liquid olefin feed is saturated with hydrogen chloride prior to contact with the iron chloride catalyst and that during the course of the hydrogen chloride addition reaction, the foregoing saturation is maintained. Reaction temperatures are in the range from about 0° C. to 200° C. In particular, at temperatures in the range from 50–60° C. to about 130° C., the resulting chloride contains but a minor portion of the undesired rearranged product.

In a preferred embodiment of the invention a 1-alkene, for example, 1-dodecene, is charged to a corrosion-resistant reaction vessel, for example, a glass turbomixer, and the liquid charge is heated to about 60° C. The dodecene is saturated with hydrogen chloride, and this saturation is maintained during the hydrochlorination by passing a saturating stream of anhydrous hydrogen chloride gas into it. About 0.15 weight percent of finely divided anhydrous ferric chloride is then added to the liquid olefin, and the resulting mixture is stirred in order to minimize possible development of local depletions of hydrogen chloride in the reaction solution. After about 30 minutes reaction time when the hydrochlorination is completed, the flow of hydrogen chloride is stopped, the resulting product is sparged with nitrogen gas, thus removing the excess hydrogen chloride. The ferric chloride catalyst is likewise removed from the product, for example, by an acidic aqueous washing thereof. The dried product is substantially pure dodecyl chloride, of which less than about 5% is isomeric, higher internal, i.e., 4,5 or 6-chlorododecane. The major portion of this product is 2-chlorododecane.

In general the subject process is more conveniently carried out at atmospheric pressure. On the other hand, in view of the limited solubility of hydrogen chloride in the olefinic hydrocarbon feed compounds contemplated for the process, the use of pressure equipment and elevated pressures of hydrogen chloride gas therein is also desirable because hydrogen chloride concentration in the reaction solution is approximately proportional to the hydrogen chloride pressure in equilibrium with the solution. The use of hydrogen chloride reaction system pressures in excess of about 35 atmospheres is usually uneconomical.

As stated above, ferric chloride is an effective catalyst for the addition of hydrogen chloride to aliphatic olefins over a wide temperature range, i.e., from about 0° C. up to about 200° C. In the range from about 0° C. to about 50–60° C. the present invention is useful as a means of minimizing concurrent chloride rearrangement as manifest in the production of higher internal aliphatic chlorides. In the range 50–60° C., depending upon the particular olefin feed, there appears to be a profound change in the reaction mechanism, and above the transition temperature, provided that the olefin feed compound has been previously saturated with hydrogen chloride, and such condition is substantially maintained during the addition of hydrogen chloride to the olefin, concurrent isomerization and the production of undesired isomeric chlorides becomes negligible. Higher internal chloride impurity in the product can be less than a few percent.

Preferably the present invention is carried out at temperatures in the range from about 50–60° C. up to about 130° C. Higher reaction temperatures are also useful, but with increasing temperature the solubility of hydrogen chloride in the liquid olefin becomes less, the need for pressure reactors becomes greater, and the use of costly pressure equipment becomes increasingly impracticable. At some elevated temperature, for example, of the order of about 200° C., and depending upon the particular olefin feed the reverse dehydrochlorination reaction becomes appreciable. That is to say, with increasing reaction temperatures above about 150° C., the problem of the reverse reaction and an unfavorable equilibrium looms larger as an unfavorable factor.

$$RCH=CH_2+HCl \rightleftharpoons RCHClCH_3$$

In the present process, satisfactory reaction times vary widely and are dependent upon the degree of conversion desired, as well as upon the particular olefin feed used. Except for the unusual discontinuity in the 50–60° C. range noted above, the reaction of the process appears to exhibit conventional temperature coefficients. At low temperatures suitable reaction times may be as long as 10 hours, or longer, while at higher temperatures, for example using a 1-alkene feed of the $C_8$–$C_{20}$ range and a temperature of about 100° C., after about a reaction time of 10–30 minutes, conversion is complete. At higher temperatures, of course, the reaction times can be shorter.

Anhydrous ferric chloride is the catalyst or precursor of the active catalyst for the process. Hydrated ferric chloride is ineffective. Water in trace amounts appears to deactivate a proportionate amount of the catalyst. Ferric chloride has a very limited solubility in the olefin feeds contemplated for the process. In the preferred manner, the process is operated using a saturated solution of anhydrous ferric chloride in the reaction system. In general it is desirable to add the ferric chloride in a finely divided form to ensure rapid saturation of the olefin, and it is further desirable to add the ferric chloride in an amount in excess of the saturation value in view of the fact that trace amounts of water impurities are also often encountered in process feed streams. On the other hand, excessive amounts of ferric chloride should not be used as a practical matter, and for other reasons. The use of more than about 5 weight percent of ferric chloride based upon the olefin feed is usually not desirable.

The mono-olefinic aliphatic hydrocarbons useful as feed compounds for the process of the invention are higher molecular weight hydrocarbons, i.e. $C_6$ and higher, and are typically liquefiable at a temperature in the process range. By definition, by the term "liquefiable" is meant that the subject olefins are liquids per se, melt, or are soluble in a saturated hydrocarbon at a temperature in the process range.

Aliphatic olefins whose carbon atom pair containing the double bond has bonded to each carbon atom thereof at least one hydrogen atom are preferred feeds for the process. For convenience of description these olefins are defined as non-tertiary olefins. Of the latter class of compounds, the 1-alkene hydrocarbons are most preferred feeds.

Representative aliphatic olefins useful in the process are 1-dodecene; 1-undecene; 1-eicosene; 1-octadecene; 1-nonene; 1-hexadecene; 1-triacontene; 1-hexene; 2-methyl-8-hexadecene; 6-cyclohexyl-3-pentadecene; 4-ethylcyclohexene; 10,10-dimethyl-1-undecene; 7-methyl-cyclododecene; 2-dodecene; 4-hexadecene; 4-eicosene; and the like unsaturated aliphatic hydrocarbons.

The use of mixtures of the foregoing olefins is also contemplated.

The invention is further illustrated by the following examples.

EXAMPLES 1–14

A series of examples illustrating the invention were run substantially in the manner described above in the preferred embodiment. The reaction conditions, feed and the results are listed in Table I, following:

sion of the olefin feed to substantially unisomerized product is nearly quantitative.

Clearly, modifications and variations of the invention as hereinbefore set forth and exemplified may be made without departing from the sense thereof. Therefore, only such limitations should be imposed as are indicated in the appended claims.

I claim:
1. In the ferric chloride catalyzed reaction in which anhydrous hydrogen chloride adds to a liquefiable mono-olefinic aliphatic hydrocarbon having at least 6 carbon atoms at a temperature in the range from about 0° C. to about 200° C., and at a pressure sufficient to maintain said olefin in the liquid phase, the improvement which comprises saturating said olefin with hydrogen chloride prior to the introduction of said catalyst into contact with said liquid hydrocarbon and substantially maintaining said saturation during the course of said hydrochlorination, thereby minimizing the production of the corresponding aliphatic chloride in which the chloride group is bonded to a carbon atom other than one of the carbon-carbon double bond pair of said olefin.

2. Process as in claim 1 wherein said olefin is a non-tertiary olefin.

3. Process as in claim 1 wherein each of the carbon atom pair containing the olefin double bond have bonded thereto at least one hydrogen atom and wherein said reaction temperature is in the range from 50–60° C. to about 130° C. thereby resulting in the production of aliphatic chloride in which the major portion thereof corresponds to product from the addition of hydrogen chloride to the carbon atoms of the olefin carbon-carbon double bond pair.

4. Process as in claim 1 wherein said olefin is a 1-alkene.

5. Process as in claim 3 wherein said olefin is a 1-alkene, less than about 5 weight percent of anhydrous fer-

TABLE I.—FERRIC CHLORIDE CATALYZED HYDROCHLORINATION OF ALPHA OLEFINS

| Run No. | Olefin | Reaction Conditions [1] | | | | VPC Product Analysis | | | | Other Analyses | | | Percent (Molar) Conversion Based on | | |
|---|---|---|---|---|---|---|---|---|---|---|---|---|---|---|---|
| | | Mols | Grams $FeCl_3$ | Wt. Percent | Temp., °C. | Wt. Percent Olefin | Wt. Percent Chloride | Isomer Distribution | | Percent Polymer By VPC Spike | Bromine No. | Percent Chlorine content | Bromine No. | VPC | Chlorine content |
| | | | | | | | | Higher | 2+3 Internals | | | | | | |
| 1 | 1-Dodecene | 0.5 | 1.6 | 2 | [5] 35–50 | 0 | 100 | 65 | 35 | 6 | 0.3 | 17.3 | 99+ | 100 | 98 |
| 2 | do | 0.125 | 0.4 | 2 | [5] 35–71 | 0 | 100 | 58 | 42 | 1.5 | 0.2 | 17.1 | 99+ | 100 | 97 |
| 3 | do | 0.5 | 1.6 | 2 | [5] 65–75 | 0 | 100 | 93 | 7 | 0 | 0.5 | 17.0 | 99+ | 100 | 98+ |
| 4 | 1-Dodecene [2] | 0.125 | 0.4 | 2 | [5] 67–81 | 0 | 100 | 46 | 54 | 0 | 0.4 | 16.9 | 99+ | 100 | 96 |
| 5 | 1-Dodecene [3] | 0.125 | 0.4 | 2 | [5] 64–76 | 0 | 100 | 85 | 15 | 0 | 0.5 | 17.4 | 99+ | 100 | 100 |
| 6 | 1-Dodecene | 1.2 | 0.3 | 0.15 | [5] 58–80 | 0 | 100 | 95 | 5 | 4 | 0.1 | 17.2 | 99+ | 100 | 98 |
| 7 | 1-Dodecene [4] | 0.25 | 0.2 | 0.5 | [6] 62–82 | 0 | 100 | 59 | 41 | 3 | 0.1 | 17.6 | 99+ | 100 | 100 |
| 8 | $C_{11}$–$C_{15}$ α-olefin | 0.125 | 0.4 | 2 | [5] 63–72 | 11 | 89 | 94 | 6 | | 8 | 15.2 | 91 | 87 | 92 |
| 9 | 1-Octadecene | 0.125 | 0.5 | 1.5 | [5] 22–25 | 0 | 100 | 69 | 31 | | 0.2 | 12.3 | 100 | 100 | 100 |
| 10 | do | 0.125 | 0.4 | 1.5 | [5] 69–75 | <1 | 99+ | 93 | 7 | | 0.5 | 12.4 | 99+ | 99+ | 100 |
| 11 | $C_{15}$–$C_{20}$ α-olefin | 1.0 | 2.6 | 1.1 | [6] 66–72 | 0 | 100 | >95 | <5 | | 2.0 | 12.5 | 97 | 100 | 95 |
| 12 | do | 1.0 | 1.6 | 0.6 | [6] 63–76 | 17 | 83 | 98 | 2 | | 5.2 | 10.5 | 91 | 81 | 78 |
| | | | | | Reactions Run at About 3 Atmospheres Pressure | | | | | | | | | | |
| 13 | 1-Dodecene | 0.25 | 0.2 | 0.5 | [5] 73–74 | 0 | 100 | 96 | 4 | ~1 | 0.25 | 18.0 | 100 | 100 | 100 |
| 14 | $C_{15}$–$C_{20}$ α-olefin | 1.0 | 5.1 | 2.2 | [6] 63–80 | 0 | 100 | 93 | 7 | | 1.0 | 12.6 | 98.5 | 100 | 96 |

[1] Olefin saturated with HCl before $FeCl_3$ added.  [2] $FeCl_3$ added without prior saturation of olefin with HCl.  [3] HCl bubbled in at half the usual rate.  [4] Dodecyl chloride solvent.  [5] Reaction times 3–33 minutes.  [6] Reaction times 1–4 hours.
VPC=Vapor Phase Chromatography.

In general, the mixture of 2+3 alkyl chlorides was composed of 75 mol percent of the 2-isomer, the balance being the 3-isomer.

From the foregoing runs, it is to be seen that without a presaturation of the olefin with hydrogen chloride, only about 45% of the chloride product is of the desired 2- or 3-isomer. (See for example Run No. 4.) The balance of the experiments demonstrate that whenever the olefin is saturated with hydrogen chloride prior to contact with the ferric chloride catalyst, there is a substantial improvement in the yield of the desired 2- or 3-alkyl chlorides.

These experiments also demonstrate that when reaction temperatures above about 50–60° C. are used and in the absence of a polar solvent (see for example Run No. 7) there is a marked temperature effect, and the converric chloride based upon said alkene is added and less than 10 percent of the resulting alkyl chloride is higher internal isomer.

References Cited

UNITED STATES PATENTS

| 1,518,182 | 12/1924 | Curme | 260—663 |
| 2,280,207 | 4/1942 | Waterman et al. | 260—663 |
| 2,467,123 | 4/1949 | Fleck et al. | 260—649 |
| 2,469,702 | 5/1949 | Schwegler et al. | 260—663 |
| 2,807,656 | 9/1957 | Cherniausky | 260—663 X |
| 2,820,069 | 1/1958 | Sanford | 260—663 |
| 3,142,710 | 7/1964 | Arganbright | 260—663 X |

BERNARD HELFIN, Primary Examiner.

T. G. DILLAHUNTY, Assistant Examiner.